(12) United States Patent
Limondin et al.

(10) Patent No.: US 6,226,783 B1
(45) Date of Patent: *May 1, 2001

(54) OBJECT ORIENTED METHOD OF STRUCTURING A SOFTWARE STEP PROGRAM

(75) Inventors: Serge Limondin, Milford; Joe Dziezanowski, Salisbury, both of NH (US)

(73) Assignee: Acuity Imaging, LLC, Nashua, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,653

(22) Filed: Mar. 16, 1998

(51) Int. Cl.$^7$ ........................................ G06F 9/45
(52) U.S. Cl. .................................... 717/1; 717/2
(58) Field of Search ............... 395/701, 200.32; 345/348; 717/1, 2

(56) References Cited

U.S. PATENT DOCUMENTS

| | | | | |
|---|---|---|---|---|
| 4,759,074 | * | 7/1988 | Iadipaolo et al. .................. 382/152 |
| 4,885,717 | * | 12/1989 | Beck et al. .......................... 395/704 |
| 5,005,119 | * | 4/1991 | Rumbaugh et al. ................ 709/101 |
| 5,077,806 | * | 12/1991 | Peters et al. ........................ 382/141 |
| 5,247,651 | * | 9/1993 | Clarisse ................................. 703/13 |
| 5,327,350 | * | 7/1994 | Endo ................................ 364/474.21 |
| 5,481,712 | * | 1/1996 | Silver et al. ....................... 395/701 |
| 5,517,663 | * | 5/1996 | Kahn ................................... 395/173 |
| 5,566,294 | * | 10/1996 | Kojima et al. ..................... 345/348 |
| 5,613,124 | * | 3/1997 | Atkinson et al. .................. 345/433 |
| 5,701,451 | * | 12/1997 | Rogers et al. ......................... 707/1 |
| 5,742,504 | * | 4/1998 | Meyer et al. ...................... 364/188 |
| 5,793,964 | * | 8/1998 | Rogers et al. ................. 395/200.32 |
| 5,892,941 | * | 4/1999 | Khan et al. ......................... 703/22 |
| 5,909,504 | * | 6/1999 | Whitman ............................ 382/141 |
| 5,923,878 | * | 7/1999 | Marsland ............................... 717/4 |
| 5,940,296 | * | 8/1999 | Meyer ................................... 700/83 |
| 5,950,201 | * | 9/1999 | Huben et al. ......................... 707/10 |
| 5,978,521 | * | 11/1999 | Wallack et al. .................... 382/294 |
| 5,991,535 | * | 11/1999 | Fowlow et al. ....................... 717/2 |
| 6,128,622 | * | 10/2000 | Bach et al. ......................... 707/103 |

OTHER PUBLICATIONS

Java Essentials for C and C + + Programmers, written by Barry Boone, p. 251, line 7–9.*

Title: Vision based robot programming, Source: Robotics Research, (Department of Tokyo University, Japan), Aug. 28–31, 1989.*

* cited by examiner

Primary Examiner—Mark R. Powell
Assistant Examiner—Chameli C. Das
(74) Attorney, Agent, or Firm—Bourque & Associates, P.A.

(57) ABSTRACT

A method for creating, describing, editing and distributing user programs, such a digital signal processing programs of the type used in machine vision applications, across multiple processing targets. Such programs are optimized on and for the target system to execute the fastest on each target system based on the target system's individual processor, operating system and memory type. The user program is made up of a series of operations called "steps" that are organized in a hierarchical structure or list and which encapsulate the data necessary for the target processor to optimally execute and program and allows optional editing in a target system native and step specific GUI environment. The user programs generated by the present method are not in a computer language nor are they created by directed programming techniques. Further, they are not interpreted. Rather, the steps include one or more associated step objects that in turn call step agents at the time of step program execution. A target system includes a step program engine that includes a number of step agents that have been previously written for that particular target system. At program run time, the step objects call the step agents. In this manner, the step program can be prepared independent of any possible ultimate target system, programming language and associated program language syntax and structure.

22 Claims, 8 Drawing Sheets

FIG. 1
(PRIOR ART)

| JOB VIEW | | |
|---|---|---|
| ◇ STEPS | ↑ DATUM | 100 |

- ▦ VisionBoard0
  - ◈ InspectionStep ~10
    - ◈ SnapshotStep ~110
      - 📷 AcquireStep ~112
      - ▫ 2PinFindStep ~114
        - 🔧 FindPin1 ~116
        - 🔧 FindSetup ~118
        - 🔧 FindPin2 ~120
      - 🔧 WarpStep ~122
      - 🔧 DefectFinder ~124
      - Ac OCVFontless Tool ~126
    - I/O I/O Output ~128

OBJECT ORIENTED METHOD OF STRUCTURING A SOFTWARE STEP PROGRAM

FIELD OF THE INVENTION

This invention relates generally to computer programs and more particularly, to the object-oriented representation and architecture of such software programs and to the representation and properties of computer programs such as those programs used to describe and effectuate real time control of various manufacturing and process control applications.

BACKGROUND OF THE INVENTION

The ultimate goal of a computer (application) program is to control the operation or processing of some form of data. More specifically, the goal of a machine vision system application program is to extract important features from image data from which a description, interpretation, or understanding of the objects in the image can be provided by the machine (computer) for the purpose of classification, reporting and decision making.

Figure 1:
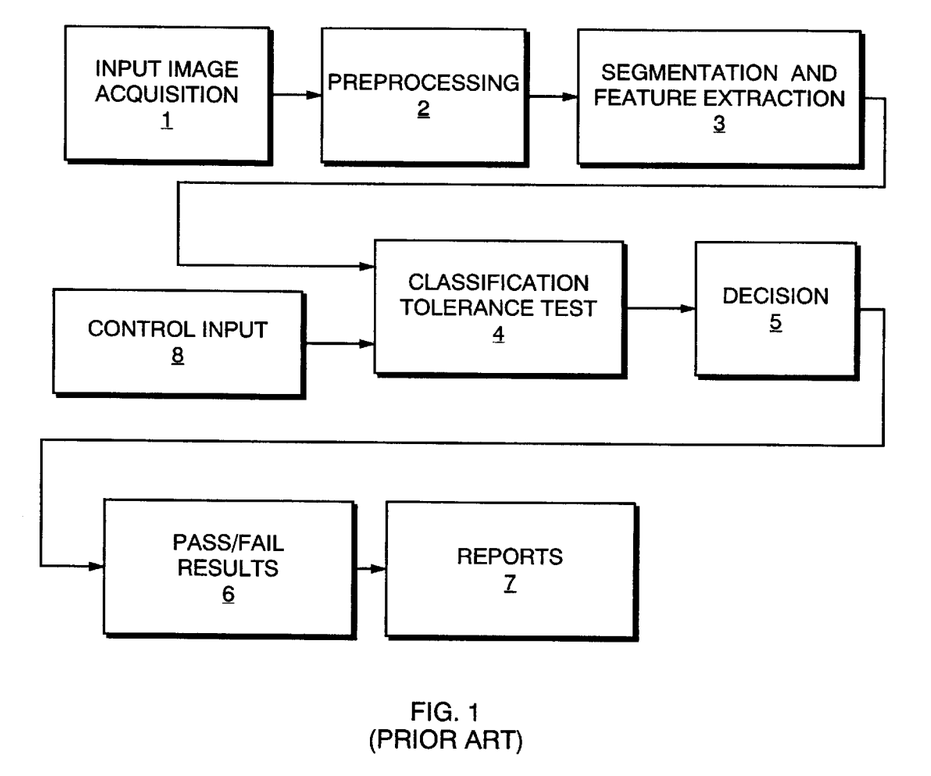
FIG. 1 shows the typical software components that make up a machine vision program.

In a machine vision application, for example, a set of operations or steps are executed in sequence. A typical machine vision program flow diagram is shown in FIG. 1. The steps generally begin with the acquisition of an input image, which is captured by a camera and placed in memory, step 1. The image is optionally preprocessed, step 2, before the image is segmented and features are extracted from it. Segmentation and feature extraction, step 3, of the image into one or more distinct objects can be accomplished, for example by extracting their boundaries. Features can be any data that describes or identifies parts, features (holes, etc.) and objects in the camera scene, such as size, area, length, distance or like parameters.

Features are usually expressed in pixel units that describe the geometric position of a feature in the image relative to some fixed position in the image such as the top left corner of the image (also called an image coordinate system), or in physical units like "mm" or inches (also called a camera coordinate system) if the position of the camera in the scene is known or can be measured (usually referred to as calibrating the camera).

These features are typically checked against tolerances or classified into various categories, step 4, before a decision, step 5, can be made or pass/fail status and results obtained, step 6. Reports can also be generated, detailing the processing application, step 7. External control inputs, step 8, are used to activate the tolerance checking and to provide nominal tolerance values during execution for a particular feature.

SUMMARY OF THE INVENTION

The object oriented method of structuring a software step program, which is the subject of the present invention and described herein, has many advantages such as it:

1) Makes simple vision applications very easy to set up, train and run, while ensuring that complex applications can also be readily configured.

2) Provides a way to extend the programs by providing drop-in functionality in the form of language independent software components. New machine vision operations can be added to the system arbitrarily as well as new user interfaces for them. There are no arbitrary limits on the type of operation that can be done or data that can be returned by these computer programs.

3) Supports building the programs from a recipe database or directly using an easy to use point and click graphical user interface.

4) Allows access of any data in the step program by name for easy scripting either locally or over a network and free form expression support.

5) Provides a mechanism for expressing result data in the step program in different systems of coordinates so that, for example, measurements between features in different cameras can be easily computed when the object is too big to fit in one camera image.

6) Allows any such named data to be encoded in a form that is compatible with the Internet addressing scheme known as the Uniform Resource Locator (URL) address for access to any data either locally or from remote host machines on an Internet or Intranet network.

7) Provides a mechanism for the machine vision program to create the user interface components that allow the training and setting of parameters using a GUI (Graphical User Interface) library native to the platform (computer or system) that the program is loaded on.

8) Allows the training and tryout (i.e. trial runs) of the machine vision program on a host with the vision processor plugged into a peripheral extension bus of the same host computer or plugged into the peripheral extension bus of a different host computer that is on the same network as the setup and training host.

9) Allows the training and tryout of the machine vision program on a host computer with a standalone vision processor connected to the host system network.

10) Runs the machine vision computer programs unchanged on different CPU architectures and takes advantage of image processing acceleration hardware when available. More specifically the architecture supports a variety of processing models (corresponding to the runtime configurations as disclosed in commonly-owned, co-pending U.S. Provisional Patent application No. 60/066,339, filed Nov. 21, 1997, which is incorporated herein by reference), including:

a) Execution of the program on a vision processor board (the target) plugged in to a peripheral extension bus of the host computer.

b) Execution of the program on the host using a vision board plugged into the extension bus for image acquisition and accelerated image processing.

c) Execution of the program on the host using a vision board for image acquisition (frame grabber).

d) For each output or result generated, a system of coordinates which specifies the units this output is expressed in is attached.

e) Execution of the program on a standalone vision processor system (the target) connected to the host over a network.

10) Allows machine vision programs to also be monitored once running on the vision processor board or vision processor target for the purpose of diagnostics and debugging from a local host or a remote host.

The invention describes an object oriented method of structuring a software step program, which creates machine vision programs by composing a set of software objects or steps self-organized into a hierarchical structure which both provides the execution order and the connection of inputs to outputs at each step and between steps.

Steps are also organized into an object-oriented software hierarchy to take advantage of commonality between steps that perform similar operations.

A step program encodes a wealth of information. For example, a step program:

a) contains a list of operations that together make up the machine vision application;

b) for each step (operation), encodes the set of parameters and settings required to execute that step (operation) successfully;

c) for each step (operation), defines the inputs that the step (operation) accepts and the outputs or results that are generated;

d) for outputs that are generated, attaches a system of coordinate information so that results can be expressed in real physical units;

e) contains information that allows for the calibration of a system of coordinates to physical, real-world units like inches or mm and also allows the conversion of results from one system of coordinates to another;

f) defines the physical relationships between a system of coordinates by organizing them into a hierarchical tree structure referred to as a part step tree, which allows, for example the description of a moving camera by inserting a stage part step (i.e. the motion device the camera is mounted on) between the camera system of coordinates and the world system of coordinates (usually the table or fixture the entire apparatus is bolted on);

g) contains information to detect whether a particular operation needs to be setup or trained by the operator of the system before it can run successfully;

h) for each operation, contains information to invoke the required user interface components that assist an operator when setting up and training step programs regardless of the GUI (Graphical User Interface) environment the step program is loaded on;

i) for each operation, can construct an executable computer program that runs on the host PC or on a vision target board directly and which dynamically detects hardware and uses hardware acceleration when available; and j) names for each step operation as well as inputs, outputs, settings and parameters, which provides a straightforward mechanism for accessing any results in the step program by name from an expression, spreadsheet or script.

In addition to describing sequences of vision operations, the disclosed step program architecture can also be used to describe a variety of other cell control operations which often have to be performed in conjunction with vision processing. Such programs include but are not limited to I/O, communications, and motion control applications. The step program architecture can even be used to exclusively describe such cell control programs that do not even contain any vision processing at all.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 2:
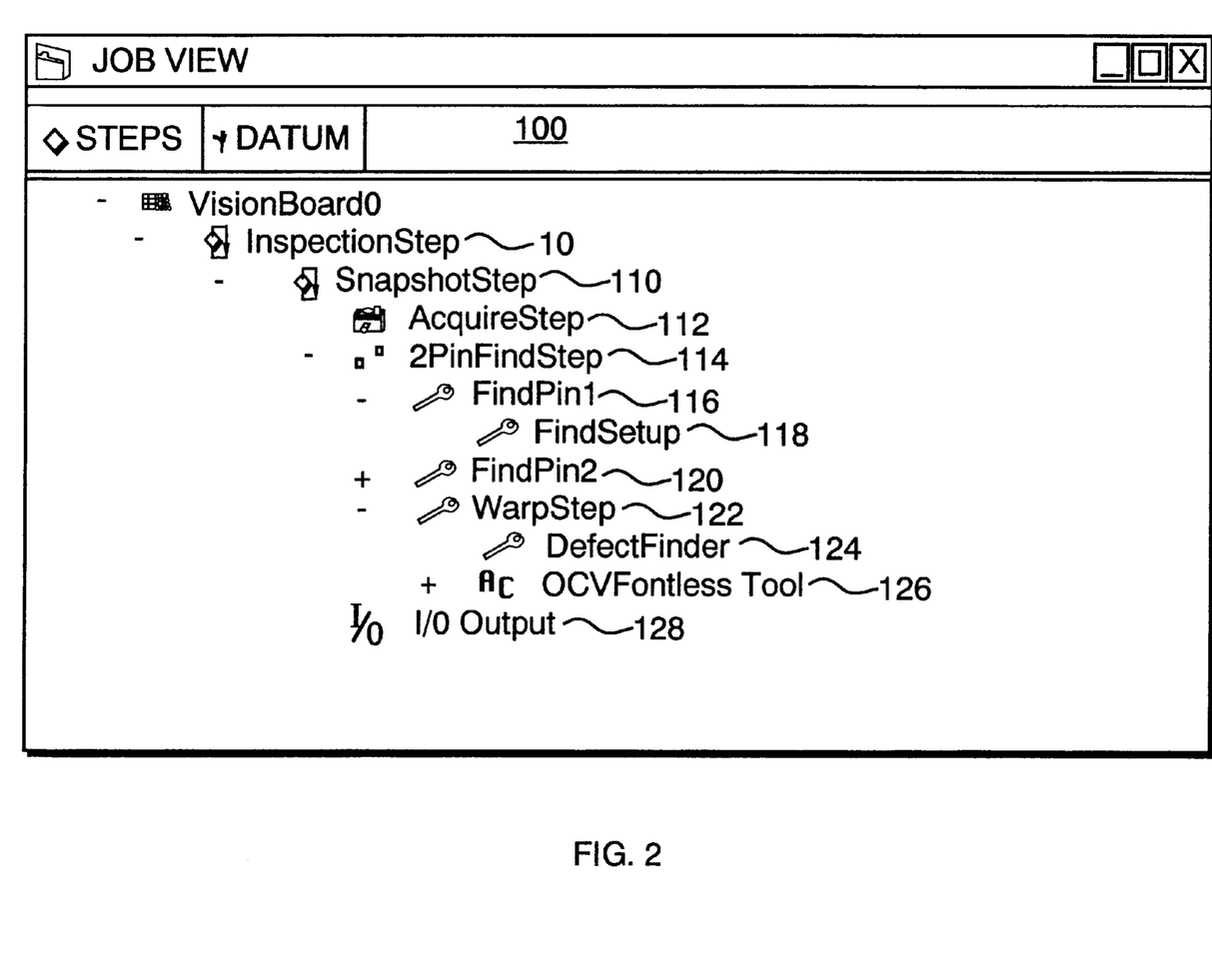
FIG. 2 shows a sample user interface view of a step program within a Host Graphical User Interface window.

The machine vision step program architecture that is the subject of this invention is preferably implemented by a set of software objects called steps organized in a hierarchical tree structure. This representation lets client code treat objects and composition of objects uniformly. A sample tree structure representation of a step program is shown in FIG. 2.

Step Program Object Framework

As described herein for exemplary purposes, steps are software objects (i.e. C++ Classes) which are combined to form the step program. They are organized in a tree or hierarchical fashion where steps can contain other steps (called children steps) to perform training, preprocessing, coordinate transformation and post processing operations. Steps communicate parameters and results by using datum objects.

Datum objects are software objects that provide standard types for all results found in a vision application and allow results from one step (output) to be used as inputs to other steps. Steps and datum objects (datums) can be edited graphically by using standard GUI component object editors well known in the industry such as one or more of the following generic component type editor such as tree control, list control, text control and/or picture control.

Editors are software objects that can create all the necessary views and user interface controls to change steps and datums using a point-and-click user interface. FIG. 2 shows the editor object that is created to display an entire step program graphically in a tree control window.

In addition, each step and datum in a step program contains a special identifier or GUID (Globally Unique IDentifier) which allows the step or datum to dynamically create the editor objects that let a user change parameters and settings and train a step or datum. The GUID is stored on the host in a special database sometimes referred to as a "registry" in the Microsoft Windows operating system, as well as inside the step and datum object itself.

The host provides standard operating system APIs (application programmer interfaces) to create an object dynamically given its GUID. This, in essence generates a dual object hierarchy where every runtime step or datum may contain a pointer to an editor object providing a user interface for manipulating the step parameters and inputs. These editor objects on the host in turn create software components which in the preferred embodiment are implemented as ActiveX controls for Windows95 or NT operating systems, that provide familiar views, windows and/or dialogs for editing and training the step parameters.

On the target, these identifiers are either ignored when the step program is controlled by the host or are used to generate runtime user interface editors to manipulate the step inputs when the machine vision step program is running in a standalone configuration (as described in next section).

Some steps create other steps to handle the runtime processing and setup or training. These steps are particularly useful in that they can assist the operator at setup time with intelligent training. Intelligent training is the operation wherein the step is shown a single sample image representative of the features that need to be detected during runtime and perform a training operation to self-define the optimal set of runtime settings and parameters.

The execution order is encoded by the step program 100 first by the position of the step in the tree, i.e. in the order one would enumerate them by reading their name from left-to-right and top-to-bottom. This is referred as walking or traversing the tree making sure each position is visited once until all steps have been traversed.

The execution order is further encoded by a special attribute attached to each step in the tree, which can modify the rule presented above. For example, step 112 in step program 100 may have an attribute set which causes it to be executed before step 110, therefore changing the execution order as defined by the tree traversal rule mentioned above. This is called a preprocessing step or more rigorously a step that has the preprocessing attribute turned on. As will be described later, attributes are not restricted to being execution order modifiers.

In FIG. 2, each iconic picture represents an individual step operation of step program 100 according to the present invention. Indented steps, in addition to their tree organization, have the following attributes:

Preprocessing steps, which are executed before their parent. (FindPin1, step 116, is an example of a preprocessing step);

Training steps, which assist the operator when setting up the parameters of an operation. (Find Setup, step 118, is an example of a training step); and Post-processing steps, which are executed after their parent. (Warp Step, step 122, is an example of a post-processing step).

Therefore, the execution order is encoded by the step program 100 both by the position of the step in the tree and by the set and selected pre/post processing attribute as well.

Special steps called container steps group together children steps and set their execution order. These container steps may also provide a common input to all their children steps. For example, the SnapShot step, step 110, defines the input image that all its contained children steps, steps 112–128, operate on, while their order dictates their rank of execution.

Figure 3:
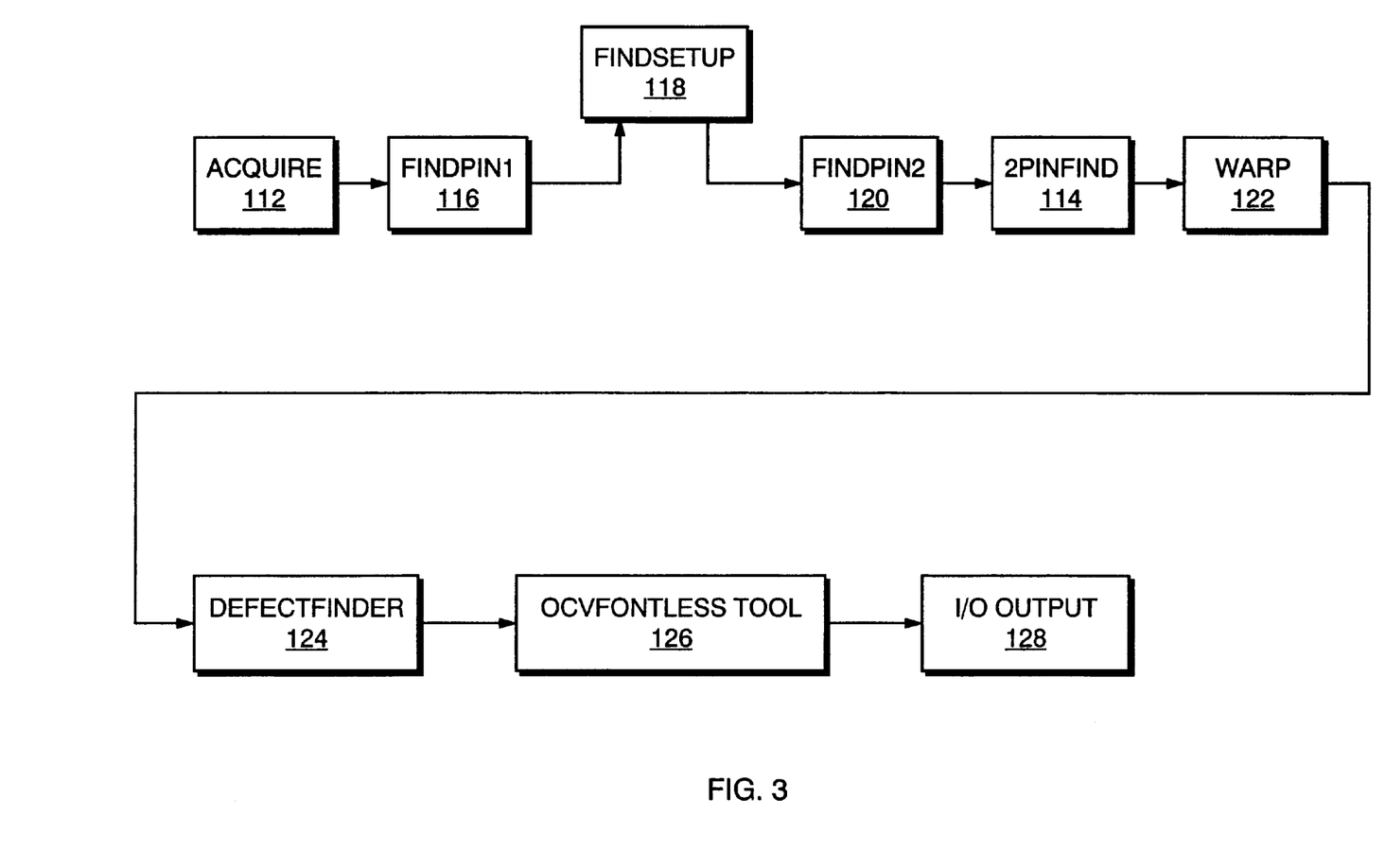
FIG. 3 shows how the step program of FIG. 2 is executed and in what order steps run.

FIG. 3 shows the step program execution order of the step program 100 of FIG. 2. The step program execution begins with the acquisition of an image, step 112. Following image acquisition, the program increments to the next step in the hierarchy, which is the 2PinFind step, step 114. However, since the 2PinFind step contains three contained children steps, FindPin1, FindPin2 and Warp Step, steps 116, 120 and 122, respectively, the program must inspect each child step's pre/post processing attribute in order to execute the steps in their proper order.

In this example, since Findpin1 and FindPin2, steps 116 and 120, respectively, are tagged as preprocessing steps, they are executed before their parent step, which is the 2PinFind step, step 114. (Note that when the FindPin1 step, step 116, is executed, its contained child step, which is the FindSetup step, step 118, is entirely skipped since its SETUP attribute tags it as a Train only step and not as a Runtime step.)

The next step in the execution order is the parent step, step 114, the 2PinFind step. Following execution of the parent, step 114, the program executes all contained post-processing steps, which, in the present example includes the Warp Step, step 122, including its contained steps, which comprise the DefectFinder and OCV Fontless Tools steps, steps 124 and 126, respectively. Finally, the step program will execute the I/O output step, step 128 and the step program will have been completed.

Referring to the representation of the step program shown in FIG. 2, it can be seen that, in addition to fixing the execution order, the children step inputs are automatically connected to their parent container outputs.

Figure 4:
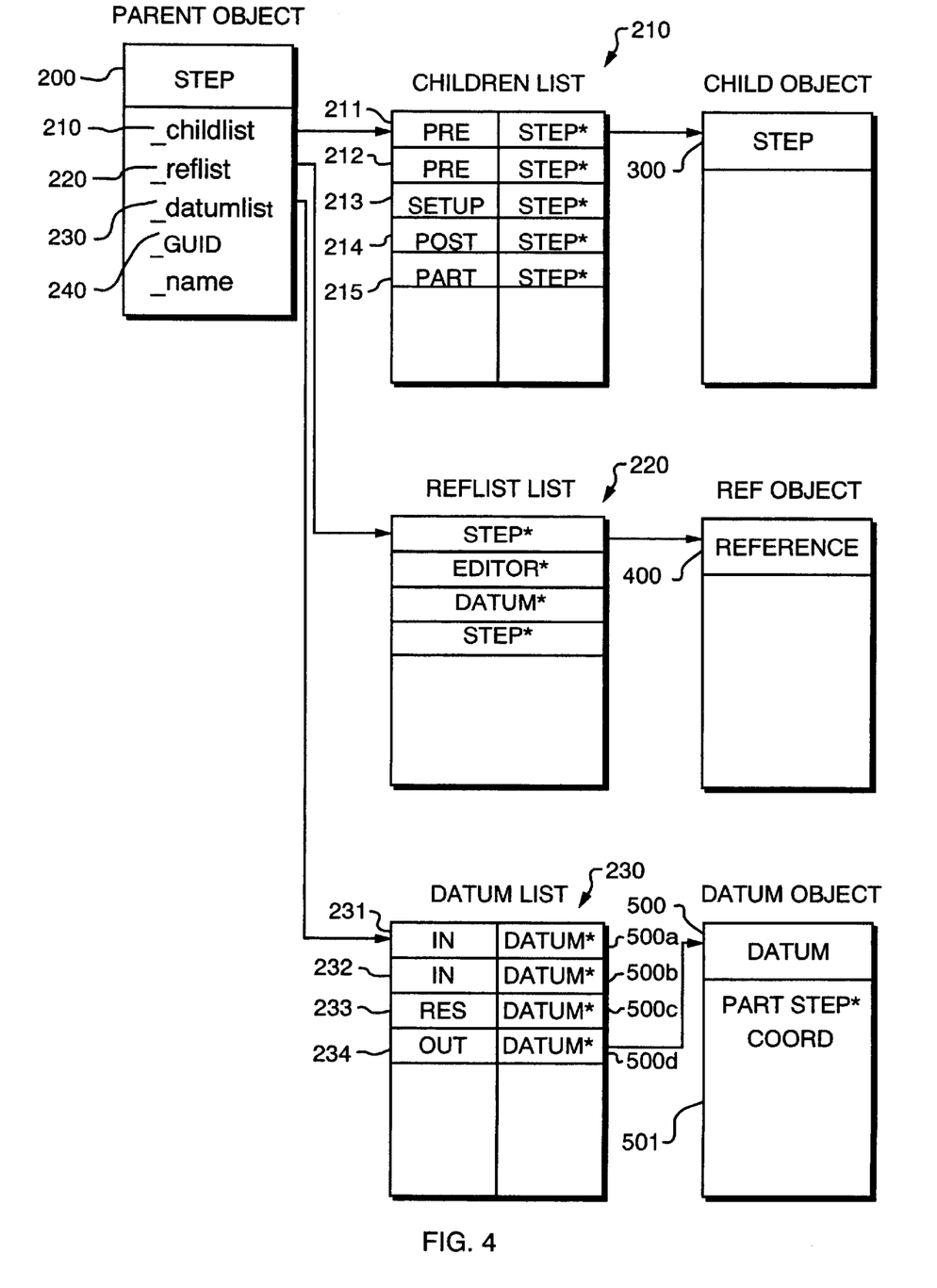
FIG. 4 shows the internal step object representation that supports this execution model.
Figure 6:
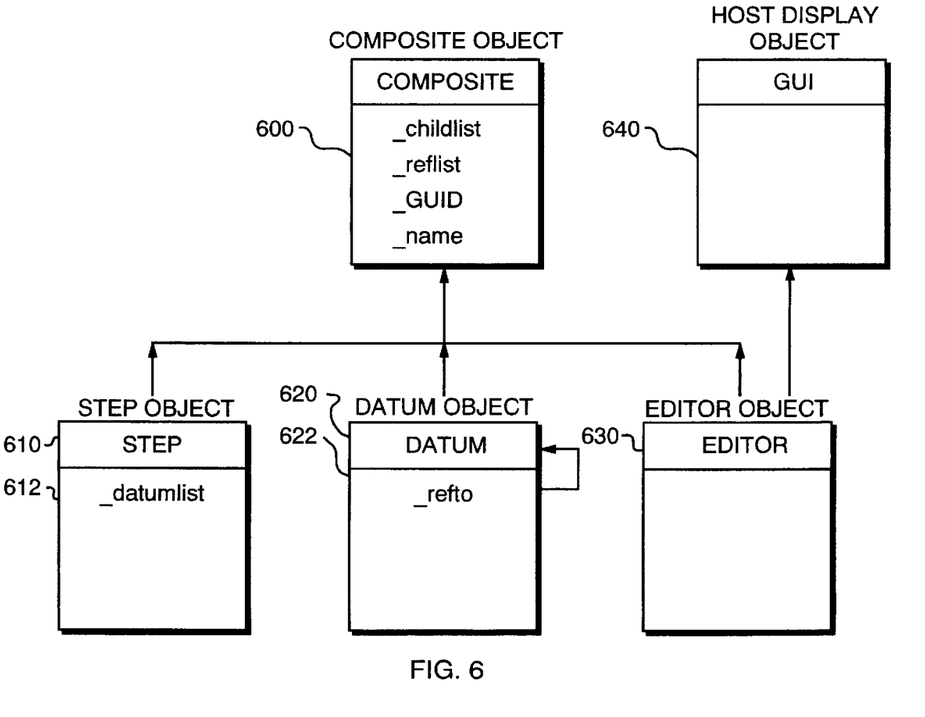
FIG. 6 shows the object-oriented inheritance hierarchy that supports both the step execution and data flow models.

Three basic software objects encode this internal data and execution flow. FIG. 4 provides a detailed structure of these software objects. The objects comprise step objects, which may be parent objects or child objects, such as step objects 200 and 300. Additional classes of objects include reference objects, such as reference object 400 and datum objects, such as datum object 500. These objects are organized into an inheritance object-oriented hierarchy from which other steps are derived from as shown in FIG. 6.

To further define the hierarchical structure, steps that are at the same indentation level, as shown in FIG. 2, (e.g. steps 112 and 114 or steps 124 and 126) are physically stored in a data structure called a map. This map storage is part of the parent step object, which contains all these children steps, i.e. the step from which these children steps are directly indented. A map is a standard C++ library container object that is used to store and link together a set of arbitrary objects. In addition, each object in the list can be individually tagged by an attribute. In the current invention, attributes are used to refine the execution order of steps (i.e. preprocessing and post processing) as well as mark special classes of steps (SETUP steps and PART steps).

Any step within a program contains a list of contained steps called a __children list (hereinafter childlist), 210 of FIG. 4. Every step in a __childlist is tagged as either: PRE (Pre Processing) (e.g. steps 211 and 212), SETUP (Train), (e.g. step 213), PART (Calibration, coordinate transformation), (e.g. step 215) or POST (Post Processing), (e.g. step 214), to control the order in which they should be executed with respect to their parent step. The __datumlist 230 contains a list of the step inputs (IN), 231 and 232, outputs (OUT), 234 and resources (RES), 233. Resources (or resource datums) are parameters or settings that need to be set in order for that step to perform its operation.

In addition, parent objects include __reflists, 220, which list the set of objects that either are using this object datums or need to be notified when the object values are changed. This list typically contains editor objects, which provide the operator of the system with a graphical view of the step or datum on the screen. FIG. 2 above is an example of such an editor object.

Editors are created by using the __GUID (Globally Unique Identifier), 240, stored inside every step or datum which defines the type of object that can provide user interface control for changing this step parameters and settings.

Figure 5:
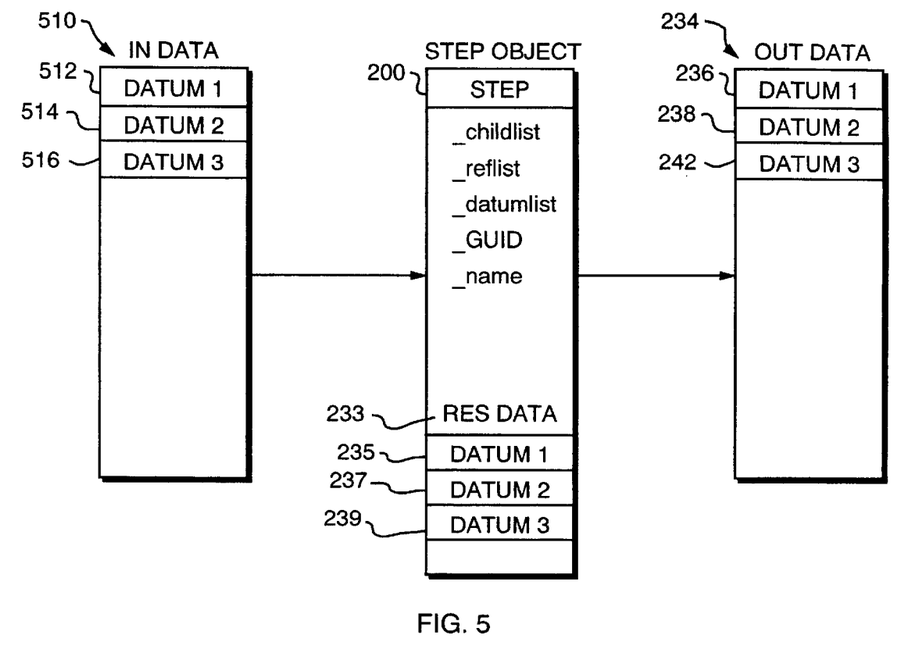
FIG. 5 details the flow of data within a step when it is executed.

During step execution, (FIG. 5) all the datums tagged as IN datums 510, such as datums 1, 2 and 3 (512, 514 and 516, respectively) are read by the step and, based on its internal resource datums, such as RES Datums 1, 2 and 3 (235, 237 and 239) the output datums, such as OUT Datum 1, 2 and 3 (236, 238 and 242) are calculated according to the operation that the step is performing.

Each output datum has a pointer, which points to a special step object called a Part step. Part steps contain information about the units for output datums. A Part step is a member of a separate tree of objects, called a "part tree", which is built when the step program is created. Special steps in the object framework, like the SnapShot step 110 of FIG. 2, create, when they are inserted into the step program tree, additional steps to provide coordinate systems or units to their output datums.

In the case of a SnapShot step, the output image is associated with this special Part step called a Snap Part step. The Snap Part step is stored in the child list of the SnapShot step and given the attribute (PART) which flags it as a system of coordinates type object. These special objects are not executed at runtime but support the Calibrate method once a camera has physically been placed into position, either on a rigid stand for a fixed camera or on a motion stage for a moving camera.

For the step program shown on FIG. 2, the part tree looks like the following:
+WorldPart << always there, World system of coordinate where everything is measured from
+SnapPart << each camera has a position in the World.
+WarpPart << Some vision tool rotate and move the image mathematically, these generate system of coordinates as well.

In the above image, the WorldPart represents the system of coordinates of the entire system with respect to some known physical position (e.g. a table, or a room in which the equipment is located). This is a default system of coordinates which is created whenever a step program is loaded from disk or created using editor objects.

The SnapPart represents the position of the camera in the world created by the SnapShot step 110 of FIG. 2.

The WarpPart represents how the image coordinates are transformed through the process of warping the image created by the WarpStep, step 122 of FIG. 2.

Each output datums, such as OUT Datum 1, 2 and 3 (236, 238 and 242) includes a part step (i.e. 501 of FIG. 4) that contains a pointer to a system of coordinates (object) which encodes the units used by this output. For an output result which is, for example, the position of a feature in an image (such as a hole) which is encoded by two numbers x and y, the system of coordinates consist of two axis where x represent the pixel position along the horizontal axis of the image and y represents the pixel position of the feature along the vertical axis of the image, with pixel position 0,0 being the top-left corner of the image.

That coordinate system object is, itself, a step that has the attribute "PART" active as shown at 501 in FIG. 4. These Part steps are inserted in the step program whenever a step that generates an image as one of its result Output datum is created.

Figure 9:
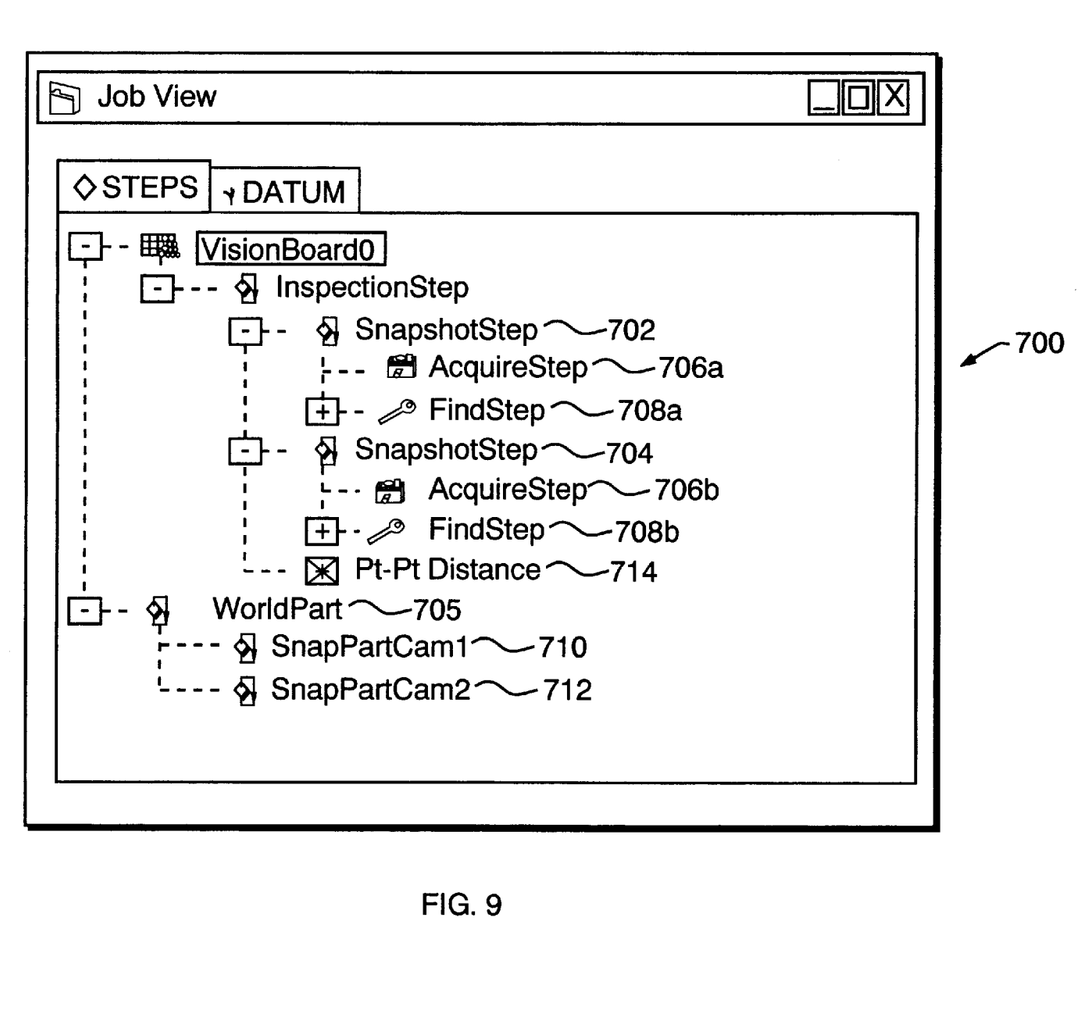
FIG. 9 shows the relationship between the output results generated by a step program and system of coordinates in the context of a two camera sample step program which calculates the distance between features in separate camera images.

For example, for the Step program 700 of FIG. 9 which calculates the physical distance between features (in the present example "holes") in separate camera images, consists of two SnapshotSteps 702 and 704, each containing one preprocessing AcquireStep 706 to capture the image from the camera, and one postprocessing FindStep 708 to locate the position of each desired image attribute e.g. (hole) (x and y coordinates of the "hole" center in each camera's image coordinate system), each snapshot step 704 creates a SnapshotStep PartStep (i.e. Step with the attribute "PART" set) and inserts it into its children list __childlist as shown at 215 of FIG. 4. The SnapPartStep encodes the position of the origin 0, 0 and axis (horizontal and vertical) of the coordinate system attached to the Output image Datum of the particular SnapshotStep. It also encodes the unit of measurement that the features calculated from this image are reported in.

Typically, all features and results extracted from a camera image are reported in pixels until the camera is calibrated to inches or millimeters. The Output Image Datum of the SnapshotStep in turn contains a pointer to the SnapPartStep as shown in the FIG. 4 datum list as output datum item 500d.

Calibrating a camera is the process by which, once the camera position has been measured or is known a priori in the World (i.e. Camera 1 (710) and Camera 2 (712) Position in the table coordinate system WorldPart 705 of FIG. 9), position in a given camera image can be converted to position in the scene (the "world"). For the step program 700 of FIG. 9, the FindStep 708 reports the position (x,y) of each "hole" or other attribute in the image being sought after, in pixel coordinates as described earlier.

The x,y position is then converted to world or scene X,Y coordinates by each SnapShot 702/704 PartStep of the respective SnapshotStep output image Datum before the physical distance between the two holes can be calculated. These two coordinate systems are shown in FIG. 9 as SnapPartCam1 (X1,Y1) 710 and SnapPartCam2 (X2, Y2) 712.

The Snap PartStep, when executed at runtime, converts a feature like the x,y position of each hole as in FIG. 9 from pixel coordinates to camera coordinates so that measuring the distance between the two holes, for example, can be calculated. In fact the SnapPartStep steps of the step program in FIG. 9 convert the x,y locations of each hole to a system of coordinates common to all cameras (i.e. WorldPart coordinate system 705 in FIG. 9).

The WorldPartStep 705, FIG. 9, represents the system of coordinates of the entire system with respect to some known physical position like the physical table or object to which the two cameras are mounted on, and is created whenever a step program is loaded into the system either on a host computer or on a vision processor system. Once the position of each hole or other image attribute in the step program in FIG. 9 has been converted by each SnapPartStep to a common system of coordinates (the WorldPart) the Pt—Pt Distance step 714 calculates the distance in WorldPart units (typically inches or millimeters) between the holes or other image attributes.

The __refto field of every datum object (e.g. 622 of FIG. 6) handles connections between inputs of one step and outputs of another. This field always points to a datum of the same type that contains the values to be used by the step during the execution of the step program.

FIG. 6 describes the way the foundation objects are organized. All basic objects can contain children objects, this is shown by the composite object, 600. Steps are composite objects that also contain datums objects 620, to receive inputs and calculate output results. Every datum object 620 contains one or more reference members 622 (__refto) so that steps can be connected together through their outputs. An output datum in this representation is a datum whose _refto pointer is pointing to itself. Editor object 630 serves as input to Host display object 640.

An immediate advantage of this structure is that a connected datum, i.e. a datum that is of the input or resource type, can also keep its own value separate from the one that is used when running. This is normally used to store nominal values.

Since every object in a step program is named, it is possible to construct a string, which uniquely describes the position or address of a result datum in the program. This allows a scripting language, or a formula for a spreadsheet cell, to build complex expressions that manipulate step data directly after a step program has been executed. For example, in FIG. 2, the FindPin1 step, step 116, locates a pattern in the image and returns its position as a point with two coordinates {x,y}. This output point is called "best-match" inside the FindPin1 step. To manipulate the point x coordinate from a script, an operator would simply type, "FindPin1.BestPoint.x". (Note that "FindPin1.BestMatch" uniquely identifies this point in the Step program.) The full address that is guaranteed to be unique is:

"VisionBoard0.InspectionStep.SnapShotStep.

2PinFindStep.FindStep1.BestPoint.x"

The expression to find out if this coordinate is greater or equal to zero is:

"FindPin1.BestPoint.x>=0".

Figure 8A:
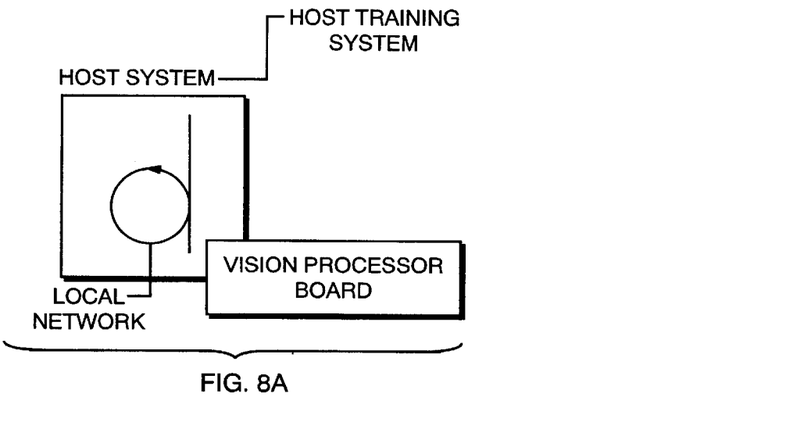
FIGS. 8A–8C are block schematic diagrams showing the host and target system network connectivity that are supported by the object oriented method of the present invention, for the purpose of creating, setting up and trying out an applications program full such as a machine vision program.
Figure 8B:
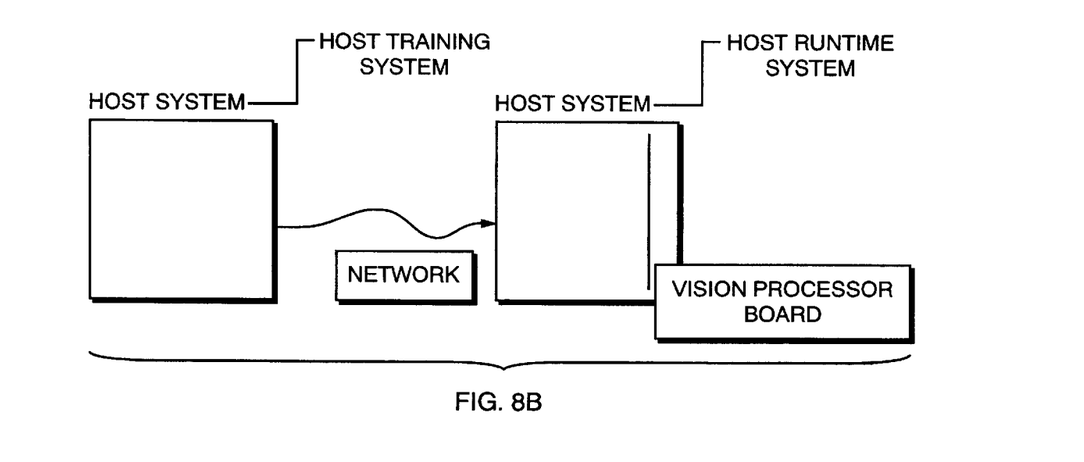
Figure 8C:
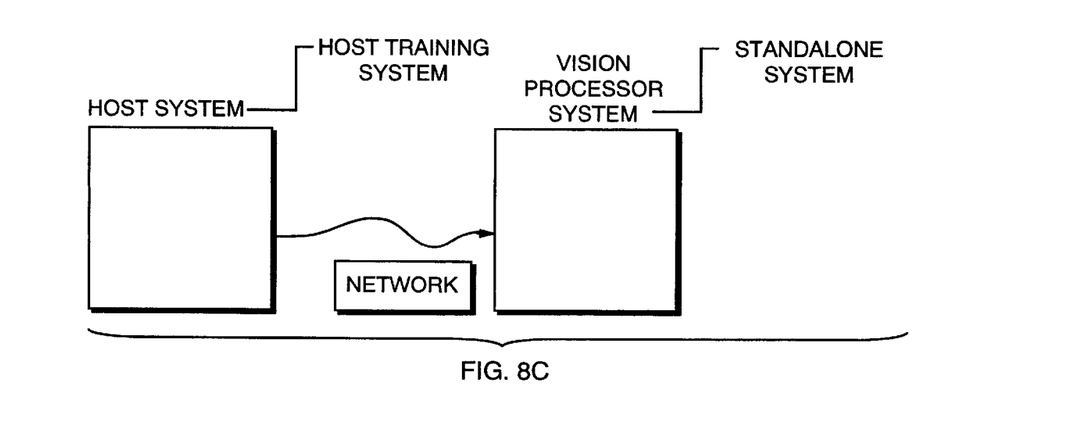

Given this representation and the fact that the host system is connected to the vision processor using either a local network (the vision processor on board the host system as shown in FIG. 8A) or a physical network as shown in FIGS. 8B and 8C, and also supported by co-pending U.S. patent application Ser. No. 09/026,052 and entitled Apparent Network Interface For And Between Embedded and Host Processors incorporated herein by reference, it is possible to encode the vision processor location into the datum address for the purpose of displaying on the host results that are calculated by a running machine vision step program.

This representation relies on the fact that the vision processor board and/or host system is setup as a Web server and can therefore answer connection from a Web browser running on the local host system (FIG. 8A) or a remote host system (FIGS. 8B and 8C).

The full address is concatenated with the Uniform Resource Locator address or URL of the vision processor board or vision processor system that is controlled by the host. This can be used to display within a Web page on the host the data value that is being computed by the machine vision step program executing on the vision processor. For the expression above, the URL address is:

http://VisionProcessorNetworkName/exec/
ShowValue!InspectionStep.

SnapShotStep.2PinFindStep.FindStep1.BestPoint.x

_where:
a) http://VisionProcessorNetworkName/ identifies the vision processor board or system the host is connected to.
b) exec/ShowValue specifies the program on the vision processor board or system to call to get the value of the data calculated by the machine vision step program.InspectionStep . . . BestPoint.x is the address of the Datum in_the step program that needs to be accessed as described earlier.

Step Program Portable Execution

Step programs can be hardware or software encoded and can be executed on different CPU architectures and can take advantage of hardware acceleration for image processing operations at runtime. This is done by late-binding of a step program to a hardware platform upon which it is to be run.

In an object-oriented language, like C++, every object that is allocated into memory also needs to be initialized. Calling a special function of the object called a constructor initializes an object. Because the step code which implements the object functions or methods is part of the application code running on that CPU and not part of the step program saved on disk, it is possible to implement the object or step functions differently depending on where the object or step is loaded.

Figure 7:
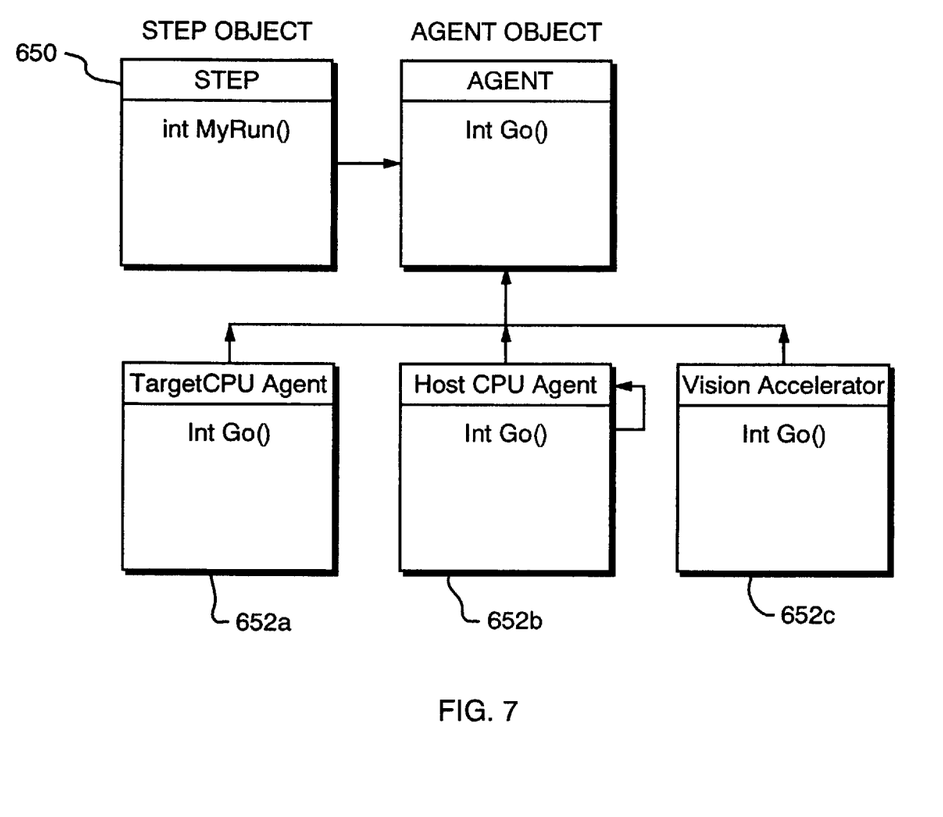
FIG. 7 shows the object-oriented inheritance hierarchy that supports the step execution late binding for optimal performance.

FIG. 7 shows the techniques which are used at runtime to efficiently execute a step program.

1. The root of the step program is a special container object called a Target object, which, when constructed, i.e. when the step program is loaded into memory causing the constructor method to be called, scans the computer for hardware resources. In particular, image acquisition devices as well as pipeline image acceleration hardware (as found on the Acuity Vision Processor board described in commonly owned, co-pending U.S. patent application Ser. No. 08/953,772, incorporated herein by reference, are detected. In addition, memory is allocated to receive the images digitized from the camera in a location where they can be efficiently analyzed by the hardware.

At runtime, the steps 650, FIG. 7, which perform image processing operations construct low-level software objects called agents 652a–652c, to analyze the image. These software agents are created using a technique called a late binding method. Late binding is the process wherein the step itself creates the software object(s) to perform the processing operation (i.e. the image processing step). Late binding is the process wherein executable code is selected/generated from a number of possible executable code sets based upon certain characteristics such as physical CPU present, operating system, type of memory, etc., with a view toward maximizing performance. In the present invention, late binding is utilized to optimize performance of the image processing system based upon the physical location of the image in the image memory.

As a result, the step program transparently supports a number of runtime models. For example:

The step program can be executed on a host CPU using digitizer hardware, such as the digitizer described in co-pending Provisional Patent Application No. 60/066,339 and previously filed U.S. Patent Application identified as U.S. patent application Ser. No. 09/030,411 filed Feb. 25, 1998 and entitled FLEXIBLE PROCESSING HARDWARE ARCHITECTURE, both of which are incorporated herein by reference, as a frame grabber board directly connected to the host CPU PCI bus.

The step program can be executed on a host CPU. However, image processing operations can be accelerated by using a vision processor such as described in commonly-owned, copending U.S. patent application Ser. No. 08/953,772 incorporated herein by reference.

The step program can be executed on a target CPU board as described in commonly-owned, co-pending U.S.

patent application Ser. No. 09/030,411, with the board plugged inside the host CPU PCI bus.

The step program can be executed on a standalone target CPU board which is connected to the host CPU over a network or not connected at all, as described in the above-referenced U.S. patent application Ser. No. 09/030,411.

Modifications and substitutions by one of ordinary skill in the art are considered to be within the scope of the present invention which is not to be limited except by the claims which follow.

What is claimed is:

1. An object oriented method of developing a step program executable on each one of a plurality of possible target systems, said method comprising the steps of:
   a) selecting at least one step from a list of steps, each step for performing a predefined function, each step for automatically selecting, at time of execution of said step program on a specific target system, at least one target system specific step agent from among a plurality of target system specific step agents, said selected target system specific step agent previously generated for optimally performing said predefined function of said at least one selected step based upon run time criteria reviewed at said time of execution of said step program on said specific target system; and
   b) providing at least one target system specific step engine including said plurality of target system specific step agents, said target system specific step engine responsive to said at least one selected step program step and to said run time criteria, for selecting at least one step agent on said predetermined target system for optimally performing said predefined function of said at least one selected step on said target system based on said run time criteria.

2. The method as claimed in claim 1, wherein said step of organizing said step program objects further comprises grouping steps that perform related operations as related steps, including parent steps and contained children steps.

3. The method as claimed in claim 2, wherein said step program objects comprise: steps, which are combined to form said step program and which comprise datums, including input datums, output datums and resource datums; and editor objects, which create all views and user interface controls.

4. The method as claimed in claim 3, wherein said editor objects create all views and user interface controls using a Graphical User Interface native to an operating system running on a target system upon which said executable step program is loaded and run.

5. The method as claimed in claim 3, further comprising the step of;
   assigning a globally unique identifier (GUID) to each step; and
   storing each GUID in a database managed by an operating system on said specific target system on which is to run the executable step program, as well as in each step and datum itself.

6. The method as claimed in claim 5, wherein said children steps are classified as: preprocessing steps, which are executed before their associated parent step; training steps, which assist an operator in setting up step parameters; and post-processing steps, which are executed after their associated parent step.

7. The method as claimed in claim 3, wherein said resource datums comprise parameters that should be set in order to permit their associated steps to perform their operations.

8. The method as claimed in claim 2, wherein said step of grouping said steps that perform related operations comprises including a list of contained steps in each parent step.

9. The method as claimed in claim 8, further comprising providing at least one common input to more than one child step.

10. The method as claimed in claim 8, wherein said step of grouping said steps that perform related operations further comprises including a reference list in each parent step, which lists the objects that utilize a common datum or should be notified when object values are changed.

11. The method as claimed in claim 10, wherein said grouping step further comprises including a reference member field in each datum object, which connects inputs of one step to outputs of another step.

12. The method as claimed in claim 1 further including the step of naming said at least one selected step of said step program including combining a URL Internet address encoding to act as a unique address for said at least one selected step program step.

13. The object oriented method of developing an executable step program as claimed in claim 1 wherein said specific target system is a step program development system.

14. The object oriented method of developing an executable step program as claimed in claim 13 wherein said specific target system is connected to said step program development system.

15. The object oriented method of developing an executable step program as claimed in claim 14 wherein said connection is via a network.

16. The object oriented method of developing an executable step program as claimed in claim 14 wherein said connection is via a computer bus.

17. The object oriented method of developing an executable step program as claimed in claim 1 wherein said specific target system is a stand alone system.

18. The object oriented method of developing an executable step program as claimed in claim 13 wherein said generated step program is run and edited on said step program development system prior to being executed on said target system.

19. The object oriented method of developing an executable step program as claimed in claim 1 wherein said target system specific step agent is optimized to run an associated step the fastest on the specific target system.

20. The object oriented method of developing an executable step program as claimed in claim 1 wherein said specific target system is identifiable by a Uniform Resource Locator (URL) address, and wherein said step of generating said step program step includes identifying said specific target system and the name of each step to be performed on said specific target system utilizing said specific target system URL, and further wherein information related to each said step to be performed on said specific target system can be accessed utilizing a World Wide Web browser.

21. The object oriented method of developing an executable step program as claimed in claim 1 further including the steps of:
   a) naming said at least one selected step of said developed step program; and
   b) organizing a plurality of said selected step program steps into a hierarchical tree structure.

22. An object oriented method of developing a machine vision step program executable on each one of a plurality of possible target systems, said method comprising the steps of:
   a) selecting at least one machine vision step from a list of machine vision program steps, each machine vision step for performing a predefined function, each machine vision step for automatically selecting, at time of execution of said machine vision step program on a specific target system, at least one target system specific step agent from among a plurality of target system specific step agents, said selected target system specific step agent previously generated for optimally performing said predefined function of said at least one selected machine vision step based upon run time criteria reviewed at said time of execution of said machine vision step program on said specific target system; and b) providing at least one target system specific step engine including said plurality of target system specific step agents, said target system specific step engine responsive to said at least one selected machine vision step program step and to said run time criteria, for selecting at least one step agent on said predetermined target system for optimally performing said predefined function of said at least one selected machine vision step on said target system based on said run time criteria.

\* \* \* \* \*